Patented Apr. 22, 1924.

1,491,166

UNITED STATES PATENT OFFICE.

DAVID D. PEEBLES, OF EUREKA, CALIFORNIA, ASSIGNOR TO WESTERN CONDENSING CO., OF EUREKA, CALIFORNIA, A CORPORATION OF CALIFORNIA.

METHOD OF DRYING MILK.

No Drawing.    Application filed March 9, 1921. Serial No. 450,816.

*To all whom it may concern:*

Be it known that I, DAVID D. PEEBLES, a citizen of the United States, residing at Eureka, in the county of Humboldt and State of California, have invented new and useful Improvements in Methods of Drying Milk, of which the following is a specification.

This invention relates to a method of drying milk and the products obtained.

To clearly bring out the objects and results obtained by the method of treating milk as described in the present application, a few explanatory clauses will first be submitted.

An average sample of milk contains 3½ per cent butter-fat, 3.2 per cent casein, .7 of 1 per cent albumen, 4 to 6 per cent lactose, and .7 of 1 per cent minerals. In other words, an average sample of fresh milk shows that the solid content averages between 12 to 13 per cent and approximately 88 per cent water. An average sample of skim-milk shows that the water content is 91 per cent and the solid content 9 per cent; said solid content consisting of casein 3.2 per cent, albumen .7 of 1 per cent, lactose 4 to 6 per cent, and mineral content about .7 of 1 per cent. All but the casein are soluble and are present in the milk as true solutions; the casein being in suspension or a colloidal form and is the only element which is acted upon by curdling agents such as acid or rennet.

In the manufacture of cheese, casein and other similar products, the milk is first curdled by allowing the acid content of the milk to develop or by adding a sufficient quantity of acid or rennet. The addition of a curdling agent causes, practically speaking, instantaneous curdling, and as the casein content is the only element acted upon, it is obvious that the remaining solid constituent will still remain in the form of a solution. This solution consists of water, albumen, lactose and several different minerals; the solution being ordinarily termed the whey. The curdled milk, together with the whey, is next placed in a press where the whey is entirely removed and it is therefore obvious that some of the chief food constituents of the milk are in this manner lost and that the cheese produced in reality only contains two of the food ingredients, to-wit, casein and butter-fat; the albumen, lactose and the several minerals contained being lost with the whey.

In many dairies and creameries after the butter-fat has been removed from the milk, such great quantities of skim-milk result that a market therefor is hard to obtain. In many instances the skim-milk is fed directly to stock, such as hogs, calves, etc., and in other instances the skim-milk is reduced to a dried or powder form and as such is used for stock feed, etc. Where the skim-milk is reduced to powder form, it is usually accomplished by first removing as much of the water content as is practicable, and then delivering the evaporated milk to a desiccating chamber where the milk is highly atomized and then subjected to a current of warm dry air; the milk entering in a highly atomized condition is subjected to the warm air and is rapidly dried and settles in the form of a powder. The two operations, to-wit, first that of evaporation, and secondly that of desiccation or removing the final vapor content, are fairly expensive operations and hence materially increases the cost of milk powder produced in this manner. The present invention relates to a method of producing curdled milk containing all of the food constituents of the milk; said curdled milk being employed for the manufacture of cheese in some instance, and is in other instances dried and ground to powder-like form.

One of the main features of the present invention is to provide a method of curdling milk which prevents the loss of the albumen, lactose and the several minerals contained and it is accomplished as follows:

The milk is first evaporated or concentrated in a suitable form of evaporator until approximately 80 per cent of the water content has been removed. A curdling agent is then added, for instance, an acid or preferably rennet, and the curd thus formed is so compact or solid that the whey is mechanically retained. The curd thus obtained may be employed for the manufacture of cheese, if it is produced from fresh milk, and in some instance even though it be produced from skim-milk. Again, the curd produced may be employed for the purpose of manufacturing dried milk as it will only be necessary to subject the curdled milk to a drying action which will remove the remaining vapor content. The dried curdled milk may then be ground as fine as desired and may be used as a stock feed or otherwise. Experience has shown that the dried curdled milk may be advantageously employed for cooking wherever milk is required, or that it may be used directly as a food for human consumption; the product being eaten either dry or moist. By this process of manufacture it is obvious that all of the constituent elements of milk are retained and can be removed from the water content cheaply and without destroying the food value in any way. A cheese manufactured from milk curdled in this manner is decidedly more nourishing than ordinary cheese, as ordinary cheese only contains butter-fat and casein, while cheese manufactured from curd produced in this manner will not only contain the butter-fat and casein, but also the albumen, lactose, and several of the minerals. If the curd produced by my process is dried and ground, it should be obvious that it is exceedingly more valuable, as a food product, than dried milk dried by any one of the ordinary processes as the dried milk produced from the curdled milk of my process is already predigested, and as such it is more readily assimilated and absorbed by the digestive organs.

Having thus described my invention, what I claim and desire to secure by Letters Patent is—

1. A method of producing curdled milk containing all of the food constituents of milk, which consists in evaporating the major portion of the water content and then curdling the milk.

2. A method of producing curdled milk containing all of the food constituents of milk, which consists in evaporating the major portion of the water content, curdling the milk and drying the curd to remove the remaining water content.

3. A method of drying milk which consists in evaporating the major portion of the water content, then adding a curdling agent to curd the milk, and finally drying the curd to remove the remaining water content.

4. A method of producing curdled milk containing all of the food constituents of milk, which consists in first evaporating the milk until substantially 80 per cent of the water content has been removed, and then adding a curdling agent, said curdling agent causing the milk to assume a dough like consistency, which will have the mechanical properties of enabling it to retain the whey and the remaining water content.

DAVID D. PEEBLES.